United States Patent [19]

Mielke

[11] Patent Number: 4,826,135

[45] Date of Patent: May 2, 1989

[54] ARRANGEMENT FOR A VALVE ASSEMBLY FOR A LIQUID JET PRINTER

[75] Inventor: Klaus Mielke, Mölnlycke, Sweden

[73] Assignee: Scandot System AB, Gothenburg, Sweden

[21] Appl. No.: 150,882

[22] Filed: Feb. 1, 1988

[30] Foreign Application Priority Data

Feb. 12, 1987 [SE] Sweden ............................. 8700544

[51] Int. Cl.$^4$ ................................................ F16K 1/42
[52] U.S. Cl. ............................ 251/333; 251/129.15; 251/359
[58] Field of Search ............ 251/333, 359, 334, 129.15

[56]  References Cited

U.S. PATENT DOCUMENTS

| 2,786,645 | 3/1957 | Ralston | 251/333 |
| 3,826,463 | 7/1974 | Beauregard | 251/120 |
| 4,064,904 | 12/1977 | Tolnai | 251/333 X |
| 4,501,299 | 2/1985 | Klimowicz et al. | 251/333 X |

Primary Examiner—Arnold Rosenthal
Attorney, Agent, or Firm—Balogh, Osann, Kramer, Dvorak, Genova & Traub

[57] ABSTRACT

The present invention relates to an arrangement (1) for a valve assembly which acts with a movable valve body (4), such as a piston, for the purpose of feeding a liquid in a liquid jet printer, the valve assembly including a valve seat (5) which extends around a liquid discharge opening (6) and interacts with said valve body to form a seal. The invention permits, amongst other things, the simple production of components parts of the valve assembly, and also permits the accurate feeding of liquid from the liquid jet printer. Said valve seat (5) is made of a flexible material (5A) capable of interacting with the moving valve body (4).

16 Claims, 3 Drawing Sheets

ARRANGEMENT FOR A VALVE ASSEMBLY FOR A LIQUID JET PRINTER

The present invention relates to an arrangement for a valve assembly of a kind which acts with a movable valve body, such as a piston, for the purpose of feeding a liquid in a liquid jet printer, the valve assembly including a valve seat which extends around a liquid discharge opening, and interacts with the valve body to form a seal.

In previously disclosed valve assemblies of the kind referred to above, the moving valve body consists of a piston-shaped body which provides an outer layer of an elastic, flexible material, such as rubber, and which is intended to be capable of interacting with the valve seat to form a seal, through which a liquid is intended to be fed at desired times, so as to be capable of being led further to the intended discharge opening, as illustrated schematically in accompanying FIGS. 1 and 2, for example. However, major problems are associated with the uniform and consistent application of a layer of precise thickness of a rubber material, for example, to the end of the moving valve body in question.

A further problem associated with previously disclosed arrangements of the kind referred to is the need to be able to feed a liquid from the liquid discharge opening in question, so that the drops of liquid, for example ink, which are intended to be "sprayed onto" the paper or other recording medium on which it is wished to produce dots which together make up the desired characters which it is intended to form, are caused to be discharged distinctly from the associated liquid outlet and to release their hold on the underlying liquid, which may present problems for the formation of completed characters.

In order to avoid, or at least substantially reduce, these problems, in accordance with the present invention, an arrangement is provided which is characterised essentially in that said valve seat consists of a single piece containing a liquid discharge opening and has a stop component of flexible material extending axially in the direction of movement of the piston which is capable of interacting with said valve body.

The invention is described below as a preferred illustrative embodiment, in conjunction with which reference is made to the accompanying drawings, in which.

Figure 1:
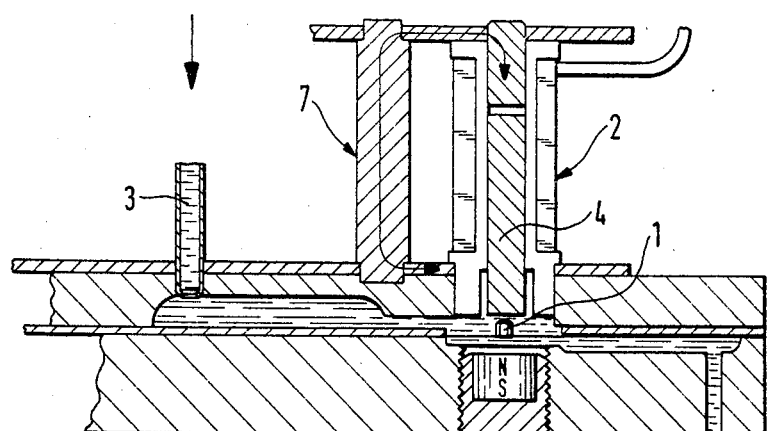
FIG. 1 shows the invention applied to a previously disclosed liquid jet printer.
Figure 2:
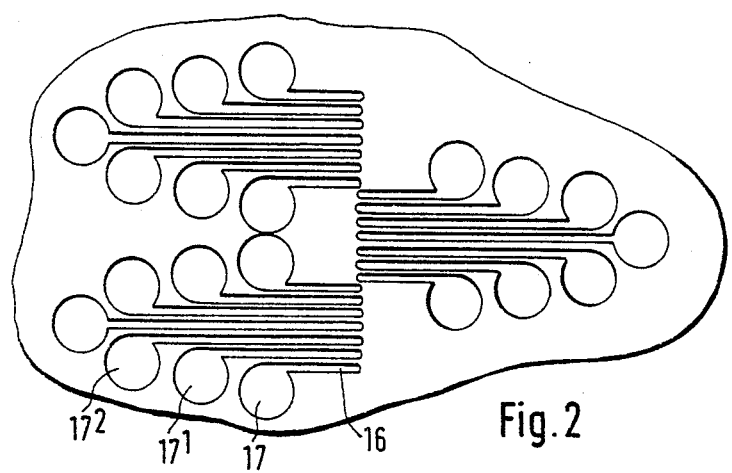
FIG. 2 illustrates schematically a number of channels leading from outlets equipped with valves to spray openings.

Referring to FIG. 1, an arrangement 1 in accordance with the present invention is shown for a valve assembly 2, for controlling the feed of a liquid 3 in a liquid jet printer. The valve assembly has a moving valve body 4, which valve body cooperates with a valve seat 5 to form a seal, said valve seat extending around a liquid discharge opening and being made of a flexible material which interacts with the moving valve body 4.

The moving valve body 4, which consists preferably of a piston, has a part 4A which consists of a metallic or some other inflexible, hard material and which is capable of being controlled so as to be actuated in a previously disclosed fashion, for example as illustrated in FIG. 1 by means of electrically actuated solenoids 7, for example, by means of springs 8 or in some other appropriate fashion, and is so arranged with said inflexible part 4A as to interact, upon being actuated in the direction of the arrow 9, with a flexible stop component 5A arranged in the valve seat 5. Said flexible component 5A can consist of an upper part of the valve seat executed preferably as an annular component, which upper part extends axially in the direction of movement 9 of the moving piston, etc., which valve seat contains a liquid discharge opening 10 situated centrally in said seat 5.

The valve seat 5, which consists preferably of a separate, annular component, which component consists preferably in its entirety, but at least at the stop part 5A situated at its end facing away from the piston, of a rubber material or some other compressible elastic material which is able to expand, is capable of being accommodated in an appropriate cavity 11 in a plate or some other suitable accommodating element 12, with its liquid discharge opening 10 connected to the liquid discharge opening 6 of the connected component 13.

The valve seat in question and the surface surrounding it can also consist of a layer of rubber material attached to an accommodating element.

Said stop component 5A is inclined in a direction away from said centrally situated liquid discharge opening 10 of the valve seat and in the direction of movement 9 of the moving valve body towards the outer generating surface 5B of the valve seat at its periphery.

Figure 3:
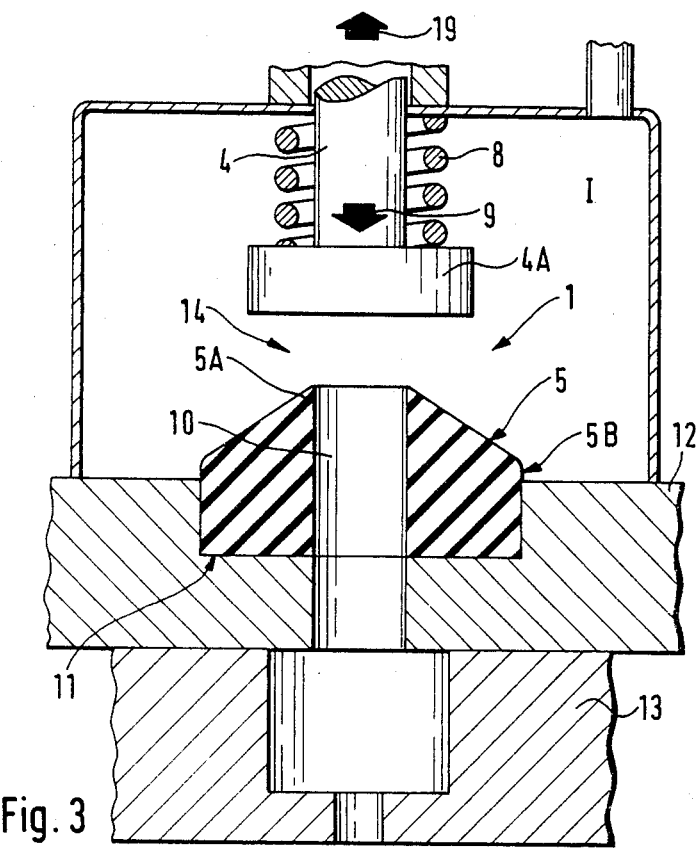
FIG. 3 shows a cross-section through an arrangement executed in accordance with the invention, with the valve in an open, unactuated position.
Figure 4:
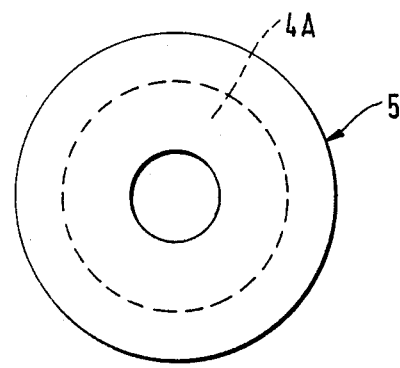
FIG. 4 shows a view of the arrangement from above.
Figure 5:
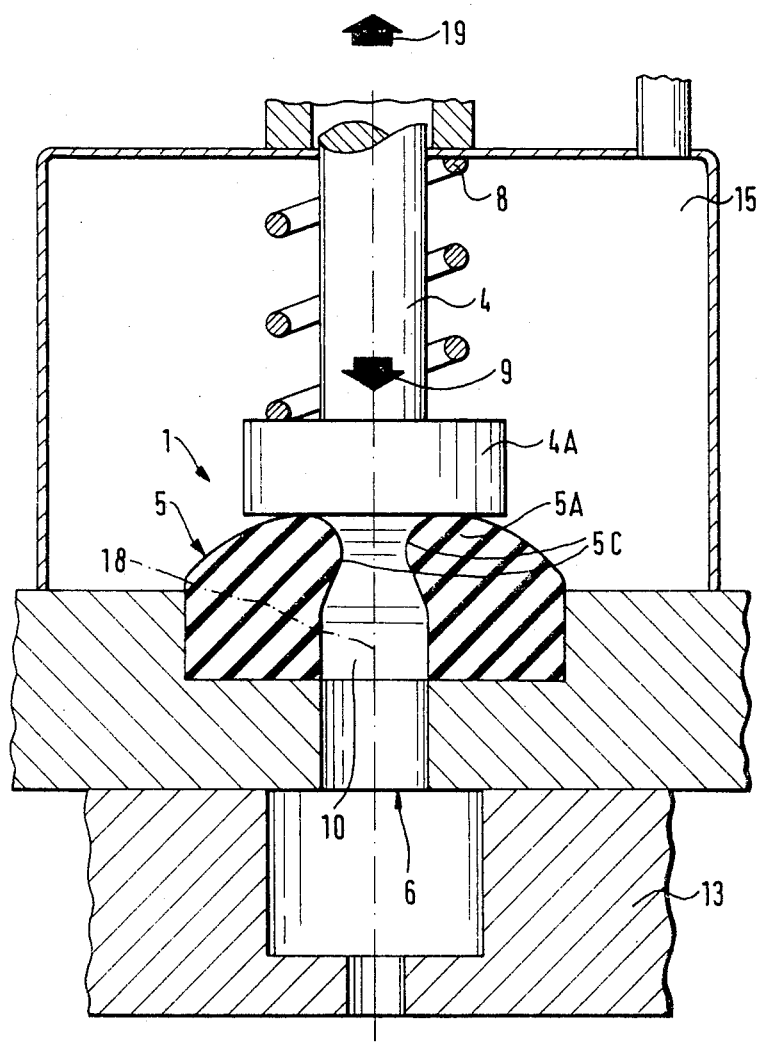
FIG. 5 shows the valve arrangement in a closed, actuated position.

The function of the arrangement described above is as follows: actuation of the solenoid 7 or some other drive means provided causes the piston 4 to be moved in the direction 9. The part 4A of the piston thus causes the stop component 5A of the valve seat to be compressed, at the same time as the passageway 14 between the piston 4 and the valve seat 5 is closed around its periphery so that the ink 3, which was previously able to flow in from the accommodating space 15, through the openings 10, 6 and on through the passageway 16 provided to the spraying point 17, $17^1$, $17^2$, etc., is caused to be sprayed out through the openings 10, 6 and to be fed onwards. The effective and forceful ejection of the drop of liquid in question is now made possible by the valve seat 5 being actuated by the piston in such a way as to expand by compression in a direction towards, amongst other things, the centre 18 of the liquid discharge opening with an expansion part 5C. The effective space available in said opening 10 is reduced in this way, so that an increase occurs in the pressure of the liquid enclosed in the space situated after the piston 5, thereby causing the desired drops of liquid to be actuated by the resulting pressure surges in such a way as to be fed distinctly and in the absence of associated spray made up of small drops. The print produced by the liquid jet printer is accordingly cleaner, thanks to the invention. When the piston is permitted to be caused to move in the opposite direction 19, the compressible stop component 5A will rapidly revert to its original form, as illustrated in FIG. 3. In said free position I liquid is permitted once more to flow past the piston 4 to the openings 10, 6, and to be fed out after further actuation of the piston 4.

The invention is not restricted to the illustrative embodiment described above and illustrated in the drawings, but may be modified within the scope of the Patent Claims without departing from the idea of invention.

I claim:

1. A valve assembly in a liquid jet printer, comprising a movable valve body which includes a piston with a stop made of essentially inflexible material, a cavity surrounding said piston and stop for holding print liquid, a liquid discharge opening, and a flexible valve seat extending around said liquid discharge opening, and forming a seal upon engagement with said valve body, characterized in that said valve seat, upon engagement with said valve body, is compressed and expands in the direction of the center of said liquid discharge opening to reduce the inside diameter of said valve seat and to force liquid through said discharge opening.

2. A valve assembly according to claim 1, characterized in that said valve seat is annular.

3. A valve assembly according to claim 2, characterized in that said liquid discharge opening is centrally situated.

4. A valve assembly according to claim 3, characterized in that said stop component is inclined in a direction away from the centrally situated liquid discharge opening of the valve seat and in the direction of the movement of the piston towards the periphery of the valve seat.

5. A valve assembly according to claim 1, characterized in that said valve seat consists of a separate piece of rubber material which is accommodated in a cavity in an accommodating element.

6. A valve assembly according to claim 1, characterized in that said valve seat and the surface extending around it consists of a layer of rubber material attached to an accommodating element.

7. A valve assembly according to claim 2, characterized in that said valve seat is so arranged, on being compressed, as to expand in the direction of the center of the liquid discharge opening, thereby reducing said opening.

8. A valve assembly according to claim 3, characterized in that said valve seat is so arranged, on being compressed, as to expand in the direction of the center of the liquid discharge opening, thereby reducing said opening.

9. A valve assembly according to claim 4, characterized in that said valve seat is so arranged, on being compressed, as to expand in the direction of the center of the liquid discharge opening, thereby reducing said opening.

10. A valve assembly according to claim 2, characterized in that said stop component of said piston which interacts with said valve seat consists of an essentially inflexible material.

11. A valve assembly according to claim 3, characterized in that said stop component of said piston which interacts with said valve seat consists of an essentially inflexible material.

12. A valve assembly according to claim 4, characterized in that said stop component of the piston which interacts with said valve seat consists of an essentially inflexible material.

13. A valve assembly according to claim 1, characterized in that said stop component of said piston which interacts with said valve seat consists of an essentially inflexible material.

14. A valve assembly according to claim 2, characterized in that said valve seat consists of a separate piece of rubber material which is accommodated in a cavity in an accommodating element.

15. A valve assembly according to claim 3, characterized in that said valve seat consists of a separate piece of rubber material which is accommodated in a cavity in an accommodating element.

16. A valve assembly according to claim 4, characterized in that said valve seat consists of a separate piece of rubber material which is accommodated in a cavity in an accommodating element.

* * * * *